April 25, 1967  R. H. KIRKHOF  3,315,841

DESTACKER HAVING RECIPROCATING TRAY DISCHARGE MEANS

Filed Oct. 21, 1965  3 Sheets-Sheet 1

INVENTOR.
RUSSEL H. KIRKHOF
BY *Price & Heneveld*
ATTORNEYS

April 25, 1967    R. H. KIRKHOF    3,315,841

DESTACKER HAVING RECIPROCATING TRAY DISCHARGE MEANS

Filed Oct. 21, 1965    3 Sheets-Sheet 2

INVENTOR.
RUSSEL H. KIRKHOF
BY
ATTORNEYS

April 25, 1967 R. H. KIRKHOF 3,315,841
DESTACKER HAVING RECIPROCATING TRAY DISCHARGE MEANS
Filed Oct. 21, 1965 3 Sheets-Sheet 3
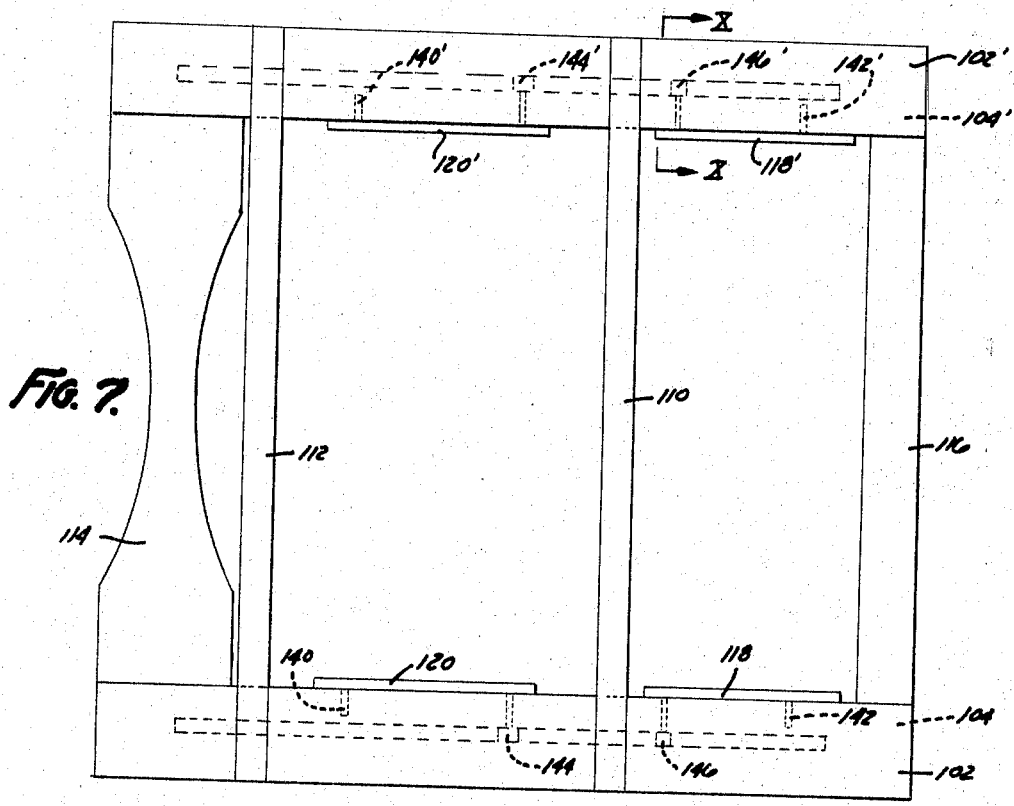
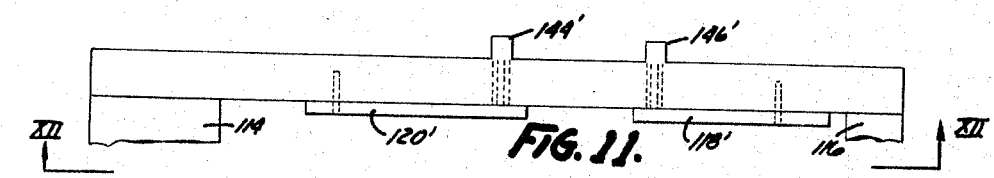
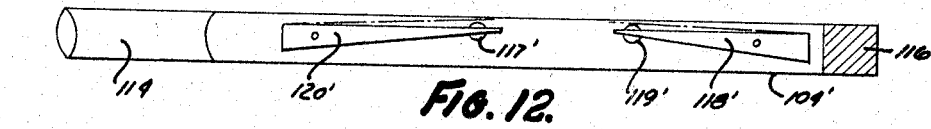
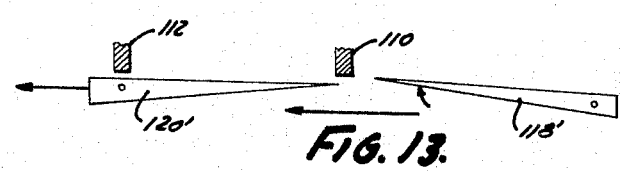
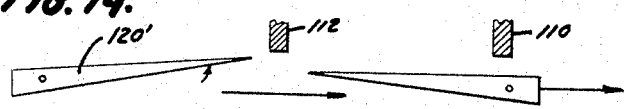
INVENTOR.
RUSSEL H. KIRKHOF
BY
ATTORNEYS

United States Patent Office 3,315,841
Patented Apr. 25, 1967

3,315,841
DESTACKER HAVING RECIPROCATING TRAY DISCHARGE MEANS
Russel H. Kirkhof, Marne, Mich., assignor to Kirkhof Manufacturing Corporation, Grand Rapids, Mich., a corporation of Michigan
Filed Oct. 21, 1965, Ser. No. 499,231
3 Claims. (Cl. 221—223)

This invention relates to an article destacker and separator for stacked articles, particularly plastic tray type articles that have end flanges that are slightly spaced from the end flanges of adjacent articles when stacked.

Increasingly, plastic containers such as transparent tray type containers are being employed in food and other fields in place of those formed of pressed paper products or equivalent materials. These plastic containers are frequently formed by die and/or pressure differential forming techniques in a shape to be nestable in a stack with each other. The thickness of the individual containers is relatively small, normally a few thousandths of an inch, so that a great number of the trays can be conveniently handled, stored, and shipped in stacked condition. The stacked containers are employed for packaging at the retail level as well as the terminal point level, e.g. by food packers.

Most effective use of the tray type containers is frequently hindered, however, because of difficulty of separating individual trays from the stack. Typically, the person doing the packing must insert his fingernail into the tiny space between the peripheral flanges of the end tray and the remaining trays in the stack, and pry the end tray out. This is both annoying and time consuming, preventing top efficiency of the operation.

It is an object of this invention to provide a plastic tray destacker and separator enabling high speed repeat removal of individual trays from a stack with a minimum of effort, without annoyance to the operator, and by the use of a relatively simple construction.

Another object of this invention is to provide a destacker for articles having end flanges, enabling rapid convenient separation of one article at a time from the stack.

Another object of this invention is to provide a destacker of simple reliable construction enabling individual article separation, even by manual operation of the destacking unit. The unit can be operated either manually or by power operation if desired.

Another object of this invention is to provide a novel destacker employing a simple reciprocating action of a slide mechanism to separate the articles. The operator need only slide the mechanism back and forth therefore to rapidly drop out individual articles as needed.

Another object of this invention is to provide a destacker and separator having a two way double action separation feature, utilizing a reciprocating motion, by employing special elements that function both as supports and separators, and specifically, which function as separators with movement of the mechanism in one direction, and as supports for the stack with movement in the other direction.

These and other objects of this invention will become apparent upon studying the following specification in conjunction with the drawings in which:

FIG. 7 is a top plan view of the apparatus in FIG. 6;

FIG. 11 is a fragmentary plan view of a portion of the slide mechanism of the apparatus in FIG. 6;

FIG. 12 is a sectional view of the slide mechanism in FIG. 11, taken on plane XII—XII;

FIG. 13 is a side elevational view of the elements in FIG. 12, showing tray separation with movement of the slide mechanism in one direction; and FIG. 14 is a side elevational view of the apparatus in FIG. 13, showing tray separation during reciprocation of the apparatus in the opposite direction to that in FIG. 13.

FIRST FORM

Figure 1:
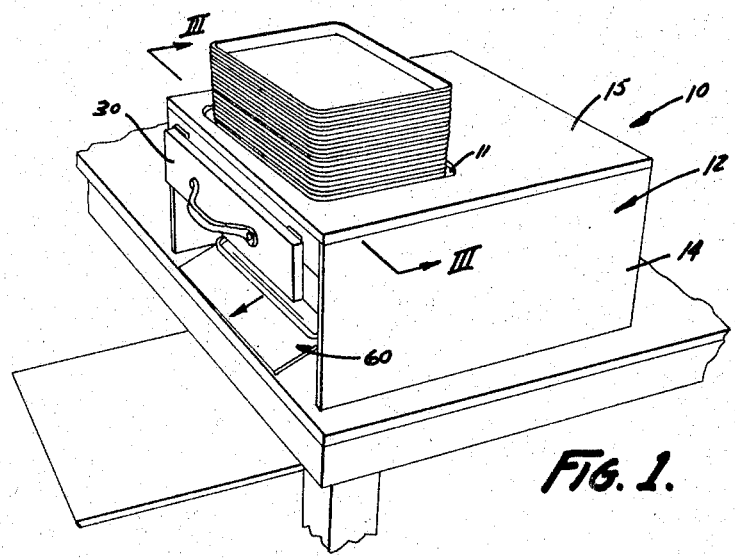
FIG. 1 is a perspective view of the first form of the invention, shown with the reciprocable slide in one position.

Referring now specifically to FIGS. 1 through 5, and the first form of the apparatus shown therein, the assembly 10 is illustrated to include an enclosure housing 12 with suitable side walls and top. Within this closure is mounted slide support means, stack retention means, and a reciprocable slide mechanism.

More specifically, secured to the inner faces of side walls 14 and 14' is a pair of like, mirror image, fixed, slide guides 16 and 16' respectively. These guides include slide rails 18 and 18', which project inwardly into cooperative grooves in the side wall elements 20 and 20' of the slide mechanism. Elements 20 and 20' are guided in a reciprocable motion between the two extreme positions shown in FIGS. 1 and 2, by guide grooves 22 and 22' in transverse cross support member 24 at the front of the mechanism, and a rearwardly spaced transverse cross support member 26. These cross supports, mounted beneath the top 15 of housing 20, and extending above elements 18, 18', 20 and 20', also serve the important function of stack retention means preventing horizontal stack movement with movement of the reciprocable drawer assembly.

Spaced parallel side elements 20 and 20' are secured together in the front by a transverse connector 30 similar to the front face of a drawer, and including a pull-push handle 32. The rear of elements 20 and 20' are interconnected by a transverse support 34, thereby forming a rectangularly shaped slide mechanism.

Mounted to the inside faces of elements 20 and 20' are pairs of cooperative supporter and tray separator elements. More specifically, element 20 has a generally rectangular stack support bar 40 (FIG. 4) and an adjacent aligned triangularly shaped bar 42' opposite bar 42. The upper surfaces of all of these elements comprise support surface means for the opposite end flanges of the bottom most trays which are to be suspended thereon.

The stack S (FIG. 1) is composed of a large number of individual trays T, but only a few representative trays are shown in the drawings for convenience. Each normally has a peripheral horizontally extending flange from all four edges. Two flanges cooperate with elements 40, 40', 42, 42'.

Figure 2:
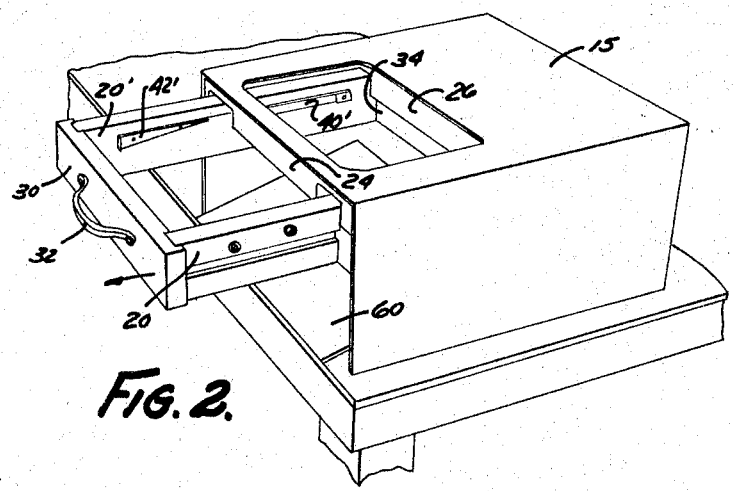
FIG. 2 is a perspective view of the apparatus in FIG. 1, shown with the slide mechanism in the second position.
Figure 3:
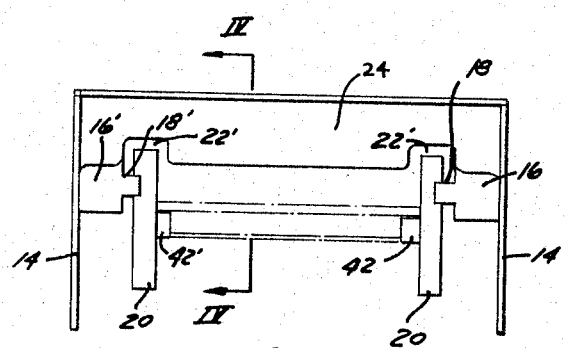
FIG. 3 is a sectional view taken on plane III—III of FIG. 1.
Figure 4:
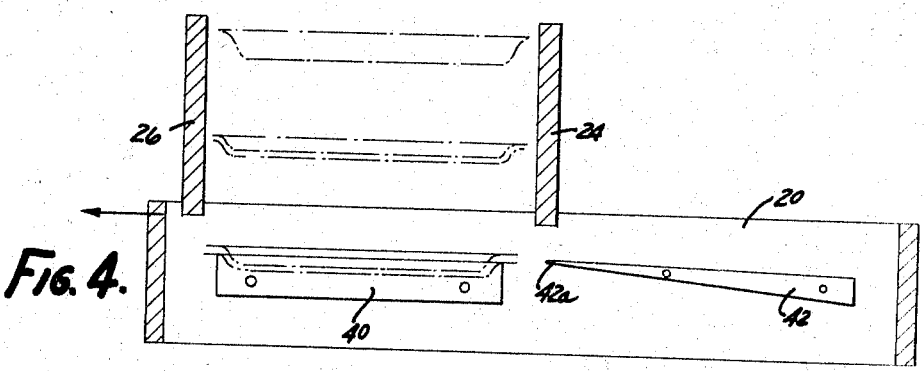
FIG. 4 is a sectional view taken on plane IV—IV of FIG. 3, showing the mechanism in one position.
Figure 5:
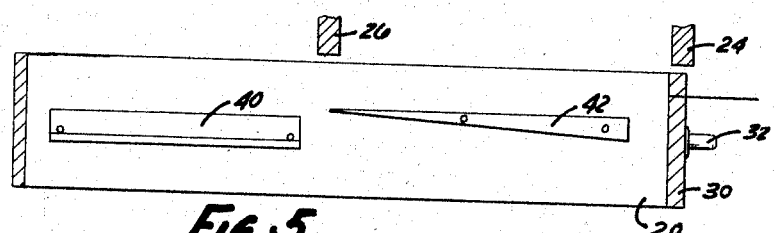
FIG. 5 is a sectional view similar to FIG. 4, showing the mechanism in its second position.

These elements are affixed to the inner walls of members 20 and 20' as by suitable screw connectors or the like. The stack S of trays is initially inserted through opening 11 in top 15 of housing 12. They may extend up through the opening, for example as shown in FIG. 1. When so inserted, assuming that the drawer slide mechanism is in its rear position illustrated in FIG. 1, the nd flanges of the bottom tray overlap the upper surfaces of elements 42 and 42' to rest thereon and support the stack. This is shown for example by the trays in FIG. 3. When the drawer mechanism is extended, as shown in FIG. 2, the lower tray has its end flanges resting upon elements 40 and 40' to suppport the stack. The triangular shaped elements 42 and 42' taper from end to end, with the upper surface being generally flat, and the lower surface extending upwardly at a small acute angle to intersect the upper surface and form a pointed apex or pointed end, e.g. 42a closely adjacent to but spaced slightly from the appropriate element 40 or 40'. In other words, elements 40 and 42 are generally aligned end to end, but at least the pointed end of elements 42 and 42', and preferably the entire upper surface of elements 42 and 42' being slightly above the upper surface of elements 40 and 40'. This difference in elevation of these upper surfaces is a small fraction of an inch, and is specifically fixed to be slightly less than the normal spacing that occurs between the flanges of the adjacent trays when they are stacked. Thus, when the slide mechanism is fully extended as shown in FIGS. 2 and 4, and the stack S of trays T is resting upon elements 40 and 40', pushing the slide mechanism into the housing to its contracted condition (FIGS. 1 and 5) will cause the pointed edges of elements 42 and 42' to slide between the flat planar flanges of the lowermost tray and the flanges of the tray there above. The tapered lower surfaces push the bottom tray down out of the stack as the support elements 40 and 40' are shifted back into a retracted position. The stack itself is prevented from moving with the slide by abutment of the stack with retention transverse member 16, so that all of the trays in the stack except the lowermost tray slide across and are transferred onto the upper surfaces of elements 42 and 42' from elements 40 and 40'. As noted the lower tray is separated from the stack by the wedging action of the triangular shaped elements 42 and 42', and drops through the opening in the bottom of the slide mechanism, for example onto a diagonally oriented guide 60 (FIGS. 1 and 2) to slide out of the assembly as illustrated by the movement of tray T.

Reciprocation of the slide mechanism back to its extended position causes the entire stack of trays to again be slid back upon and transferred to elements 40 and 40' to ready the unit for the next tray separation. Thus, with each back and forth reciprocation of the slide mechanism in two directions, one tray is separated.

It will be realized that the divergent relation of the upper and lower surfaces of elements 42 and 42' is significant for the wedging action, but the shape of elements 40 and 40' is not significant because it is only important that the upper surfaces be stack supporting means.

SECOND FORM

In FIGS. 6 through 14 is shown a double acting form of the invention, enabling a tray to be separated from the stack with each linear movement of the slide mechanism in one direction.

Figure 6:
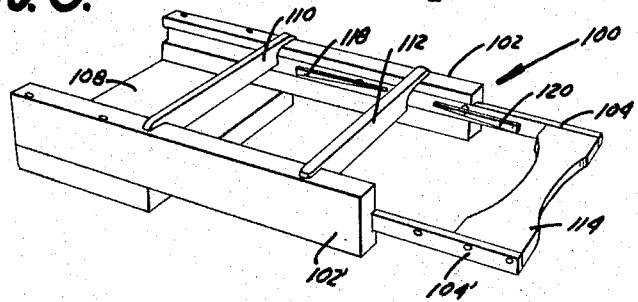
FIG. 6 is a perspective view of the second form of the invention, having a double action separation.

More specifically, assembly 100 shown in FIG. 6 (without its housing for purposes of convenience), likewise includes a pair of slide guides 102 and 102' having tracks that are shown as grooves. These tracks receive two slide elements 104 and 104'. Fixed outer slide guides 102 and 102' may be secured together by an underlying transverse plate 108 and by spaced transverse stack retainers 110 and 112 extending between elements 102 and 102'.

Slide elements 104 and 104' are likewise interconnected by transverse front brace 114, and rear brace 116. Element 114 also comprises a pull-push handle.

In this double acting assembly, each of elements 104 and 104' of the slide mechanism has on its inner face a pair of separator-stack supporter means, namely elements 118 and 120 on the inside face of element 104, and 118' and 120' on the inside face of element 104'. Element 118 is directly opposite element 118', and element 120 is directly opposite element 120'. In this form of the invention, all four of these elements are generally triangular or wedge shaped in configuration, having upper and lower faces that converge at a small acute angle to an apex. The apex edges or ends on the elements extend toward and are adjacent each other. By this configuration of the elements, and with controlled vertical positioning of the elements, each element has a dual function of stack supporter and tray separator so that the individual trays can be ejected from the bottom of the stack with each reciprocable movement.

More specifically, in order to achieve this dual function, at least the pointed leading edge of each oppositely positioned pair of elements must be simultaneously elevated at controlled positions to intersect between the bottom tray flanges and the flanges of the trays there above. This requires vertical shifting of the individual elements, to controllably position the pointed ends temporarily above the upper stack support surfaces of the adjacent pair of elements. This may be accomplished by a pivotal motion on pivot axes on the ends of the elements opposite the apex ends. This is shown by pivotally mounting these opposite ends of each of the elements and controlling the apex ends with cams. Element 120 is pivotally mounted on front pivot shaft 140 to element 104, front end of element 120' is pivotally mounted on pivot shaft 140' to element 104', the rear end of element 118 is pivotally mounted on pivot shaft 142 to element 104, and the rear end of element 118' is pivotally mounted on pivot shaft 142' to element 104'.

Figure 8:
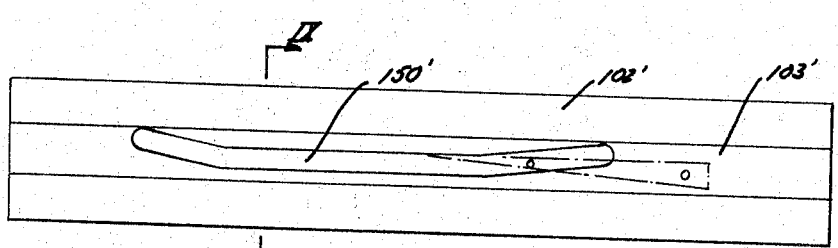
FIG. 8 is a side elevational view of the inner face of one of the outer side rail elements of the apparatus in FIG. 6.
Figure 9:
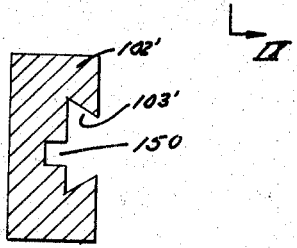
FIG. 9 is a sectional view of the element in FIG. 8 taken on plane IX—IX.
Figure 10:
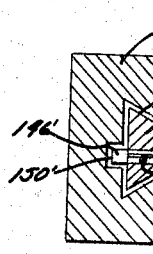
FIG. 10 is a sectional view similar to FIG. 9, but showing the assembly, and taken on plane X—X of FIG. 7.

The inner adjacent pointed apex ends of these elements are likewise mounted to be cammed upwardly and downwardly. Element 120 has on its rear inner end an outwardly projecting cam follower 144, element 120' has a like cam follower 144' on its rear end, element 118 has a like cam follower 146 on its front end, and element 118' has a like cam follower 146 on its front end. These cam followers extend through enlarged slots 117, 117', 119 and 119' in respective elements 104 and 104', to extend into and be cooperative with a pair of cam tracks. One of these mirror image tracks is illustrated in FIG. 8 by cam track 150 in slide guide 102. This cam track includes a central, horizontal straight main portion and end portions upwardly diagonally oriented at a small acute angle, to cause selective raising and lowering of elements 118, 118', 120 and 120'. These cam tracks are formed into the back wall of the dove tail receiving slots, e.g., track 150' in slot 103', that receive the cooperative dove tail shaped slide members, e.g., 104'. Thus cam followers 144' and 146' of elements 120' and 118' are positioned in cam track 150', by extending through vertically elongated openings 117' and 119', and followers 144 and 146 are in cam track 150 by extending through openings 117 and 119 (FIG. 7).

When the slide mechanism is in an intermediate position between its extreme end positions the cam followers are in the central part of the cam tracks. If the unit is shifted to one extreme, cam followers 146 and 146' ride up the diagonal cam track ends, to lift the pointed ends of elements 118 and 118'. When the slide mechanism is shifted to the opposite extreme, cam followers 144 and 144' are elevated to shift the pointed inner ends of elements 120 and 120' to a position just above the horizontal upper surfaces of elements 118 and 118'. This movement of both elements is shown by the solid line positions and the phantom line positions in FIG. 12. The elevation occurs at the ends of the shifting movement to prepare the elements to remove a tray on the reverse movement.

When the slide mechanism is shifted from the position in FIG. 7 in the directions indicated by the arrow in FIG. 13, the pointed inner ends of elements 118 and 118' are elevated just sufficiently above the upper surfaces of elements 120 and 120' to extend between the flanges of the lower most tray and the next adjacent tray. As the slide moves the cam followers move into the straight central part of the cam tracks, dropping the elements slightly so that by this dropping action and the wedging action of the triangular elements the lower most tray is pushed down out of the stack while the upper trays are transferred from supporting position on elements 120 and 120' to 118 and 118'. As the movement continues, the apex ends of elements 120 and 120' are elevated as shown by FIG. 14. The unit is then ready for movement in the direction shown by arrow in FIG. 14, to cause elements 120 and 120' to extend between the then lower most tray and the trays there above, to separate it and drop it through the open bottom of the assembly. The stack is retained from moving in either direction by transverse stack straddling elements 110 and 112 above the support elements.

Thus, shifting of the slide assembly in either direction causes separation of a tray. The slide mechanism may actually be shifted at high speeds to drop individual trays at any rate desired. The mechanism, although relatively simple, is extremely effective. The components required are relatively few, with the expense being relatively small.

It is conceivable that further variations on this construction could conceivably be made to suit particular types of articles, particular areas of usage, and the like. Therefore, the invention is intended to be limited only by the scope of the appended claims and the reasonably equivalent structures to those defined therein.

I claim:

1. A double acting destacker for tray type articles having opposite edge flanges comprising: slide means movable reciprocally back and forth in one generally horizontal dimension; said slide means having two pairs of adjacent stack supporting and tray separating elements, each pair being spaced from each other on opposite sides of a tray deposit opening, and each element of each pair being generally aligned with a corresponding element of the second pair, in said dimension; stack restraining means extending above said opening and elements, and positioned to restrain stack movement in said dimension; said slide means being shiftable back and forth beneath said restraining means to shift said pairs alternatively beneath said restraining means; said elements each being tapered to form article intersecting ends and to comprise article separating means near the adjacent corresponding element, and each having upper stack support surface means; and means to controllably cause slight vertical shifting of the tapered ends of each pair of elements slightly above those of the second pair prior to movement of said one pair beneath said restraining means.

2. The destacker in claim 1 including support means slidably mounting said slide means, and wherein said vertical shifting means comprises a camming means between each element and said support means.

3. The destacker in claim 2 wherein said camming means includes a cam track means in said support means and cam follower means attached to each of said elements and positioned in said cam track means.

References Cited by the Examiner

UNITED STATES PATENTS

| 1,260,432 | 3/1918 | Nias | 222—223 X |
| 1,666,008 | 4/1928 | Graffenberger | 221—221 |
| 2,956,706 | 10/1960 | Austgen et al. | 221—221 |
| 3,169,356 | 2/1965 | Dye | 221—221 X |

FOREIGN PATENTS 622,288 12/1962 Belgium.

ROBERT B. REEVES, *Primary Examiner.*

WALTER SOBIN, *Examiner.*